United States Patent [19]

Ohshita

[11] Patent Number: 5,315,331
[45] Date of Patent: May 24, 1994

[54] OPTICAL APPARATUS CAPABLE OF PERFORMING A PANORAMIC PHOTOGRAPHING

[75] Inventor: Koichi Ohshita, Tokyo, Japan
[73] Assignee: Nikon Corporation, Tokyo, Japan
[21] Appl. No.: 65,035
[22] Filed: May 24, 1993

Related U.S. Application Data

[63] Continuation of Ser. No. 787,090, Nov. 4, 1991, abandoned.

[30] Foreign Application Priority Data

Nov. 9, 1990 [JP] Japan ................................. 2-305820
Nov. 27, 1990 [JP] Japan ................................. 2-323761

[51] Int. Cl.⁵ .............................................. G03B 37/00
[52] U.S. Cl. ..................................... 354/94; 354/286; 354/195.12; 354/159
[58] Field of Search ............ 354/94, 222, 286, 195.12, 354/75, 105, 159, 295; 352/79

[56] References Cited

U.S. PATENT DOCUMENTS

| | | | |
|---|---|---|---|
| 4,451,129 | 5/1984 | Ikari et al. | 354/195.12 |
| 4,583,831 | 4/1986 | Harvey | 354/106 |
| 4,751,539 | 6/1988 | Yamada et al. | 354/222 |
| 4,862,201 | 8/1989 | Taniguchi et al. | 354/105 |
| 4,887,107 | 12/1989 | Nakamura et al. | 354/195.12 |
| 4,967,214 | 10/1990 | Taniguchi et al. | 354/105 |
| 4,973,997 | 11/1990 | Harvey | 354/222 |
| 5,010,357 | 4/1991 | Misawa | 354/159 |
| 5,066,971 | 11/1991 | Kodaira | 354/222 |
| 5,086,312 | 2/1992 | Tanaka et al. | 354/195.12 |
| 5,166,716 | 11/1992 | Kawano | 354/195.12 |

*Primary Examiner*—Monroe H. Hayes
*Attorney, Agent, or Firm*—Shapiro and Shapiro

[57] ABSTRACT

An optical apparatus capable of a panoramic photographing includes a photographing lens, an auxiliary lens having positive refraction to convert its focal length synthesized with the photographing lens to a focal length shorter than the individual focal length of the photographing lens without changing the positions of an image formation, and an auxiliary lens supporting means which removably supports the auxiliary lens in the optical path between the photographing lens and the image-formation plane, and is constructed to perform easily a usual photographing individually with the photographing lens as well as a panoramic photographing with the installation of the auxiliary lens.

26 Claims, 12 Drawing Sheets

OPTICAL APPARATUS CAPABLE OF PERFORMING A PANORAMIC PHOTOGRAPHING

This is a continuation of application Ser. No. 787,090 filed Nov. 4, 1991, now abandoned.

BACKGROUND OF THE INVENTION

1. Field of the Invention

The present invention relates to an optical apparatus capable of photographing in a panoramic size. More particularly, the invention relates to an optical apparatus for photographing by switching a Leica size over to a panoramic size.

2. Related Background Art

A panoramic camera is a camera capable of taking a picture of a so-called panoramic size shown in FIG. 19A which is extremely long from side to side as compared with an ordinary picture, and is suited for photographing an extensive scene or the like. The panoramic camera has been in use for a long time. Nevertheless, amateur cameramen in general find it rather difficult to enjoy the panoramic photographing because photographic shops (the so-called labos) are not prepared usually to develop such a film, print it automatically, or perform other processings due to the special frame size of the film.

In recent years, however, a panoramic size film has been developed using a usual 35 mm film (JIS 135), the so-called Leica size of 24×36 as shown in FIG. 19B, for example. The panoramic size film, which is now in the spotlight among those who are in the art, is in a size of 13×36 mm such as obtainable by narrowing the frame size of the above-mentioned 35 mm film vertically as shown in FIG. 19C. Thus, by maintaining the dimension in the lateral direction the same as the Leica size, it becomes possible to perform the film development and printing with the conventional labo-equipment and instruments. At the same time, the so-called disposable camera dedicated for this type of panoramic film is now available in the market, promoting a rapid popularization thereof among the general amateur cameramen as a panoramic film which they can use without difficulty. In manufacturing a camera, this panoramic film also has an advantage that with the same dimension as the Leica size in the lateral direction, it is possible to implement with ease the camera which can be used both for the usual Leica size and the panoramic size by the use of a shade and others to narrow the exposure area of the film.

In other words, it is possible to implement easily a camera whereby a picture can be taken in the panoramic size by modifying the conventional camera slightly or incorporating some attachment therein. In fact, among camera dilettanti, there are some who modify the conventional 35 mm camera into a panoramic camera by shading the upper and lower parts of the longitudinal direction of the film aperture 10 of the camera body B with think flat shading members 20 as shown in FIG. 20. Recently, a kit for such a modification is commercially available on the market.

With this method, however, while the photographing can be performed in a panoramic size, the angle of view whereby a picture can be taken by a same camera beocmes narrow as compared with the usual state of its use. For example, whereas the photographing lens having its focal length of 35 mm in the Leica size has an angle of view of approximately 63° with the diagonal line contained, the angle of view becomes approximately 57° in the panoramic size, which is equivalent to a focal length of 40 mm in terms of the Leica size. This cannot be termed as a wide angle lens. Also, a lens having a focal length of 28 mm has an angle of view of 63° likewise, but it has an angle of view of only approximately 57° with the diagonal line contained in the panoramic size, which is equivalent to a focal length of 40 mm in terms of the Leica size. With this result, it cannot be said, either, that the angle of view of a wide angle lens has been utilized sufficiently. Also, likewise, a lens having a focal length of 28 mm has an angle of view of approximately 68° with the diagonal line contained in the panoramic size, but it produces a narrow angle of view in the Leica size, which is equivalent to a focal length of 32 mm. As described earlier, the panoramic size is a format which is suited for performing a photographing in a wide area in the lateral direction. It is therefore a considerable disadvantage that the angle of view becomes narrower.

In order to avoid this disadvantage, a photographing lens having an extremely wide angle of view should be prepared in advance. In optical designing, however, the wider the angle of view is, the more difficult it is to design a lens, and it is also unavoidable to increase the manufacturing cost of the camera as a whole and to make the size thereof larger because the numbers of elements to construct a lens increase and the lens diameter becomes greater. Also, when a photographing lens to be installed is a single focus lens, the adoption of a lens having an excessively wide angle of view for the use of the panoramic size photographing may lead to a danger that general users find it difficult to use such a lens because the angle of view becomes wider in taking a picture in the usual Leical size. In addition, it should be mention that a photographing lens is used rather wastefully because with this method the upper and lower part of an objective image are simply shaded for the purpose and the angle of view genuine to such a photographing lens is not fully utilized.

SUMMARY OF THE INVENTION

Now, the present invention is to implement as its first objective a wide angle photographing in a panoramic size without making the entire body of a camera larger and provide an optical apparatus for the use of the camera enabling such a camera to have an appropriate angle of view in a usual format (Leica size).

Further, as a second objective, the present invention is to provide a panoramic attachment which can be used in a panoramic size up to the same angle of view as in the usual Leica size.

An optical apparatus capable of performing a panoramic photographing according to the present invention includes a photographing lens for forming an image on a predetermined image plane, an auxiliary lens having positive refractive power to convert its focal length synthesized with the photographing lens to a focal length shorter than the individual focal length of the photographing lens without changing the positions of an image formation, and an auxiliary lens supporting means which removably supports this auxiliary lens in the optical path between the photographing lens and the image-formation plane, and is constructed to perform easily a usual photographing individually with the photographing lens as well as a panoramic photographing with the installation of the auxiliary lens.

Also, an optical apparatus capable of performing a panoramic photographing according to the present invention is also structured as an attachment to a camera having a film aperture of 24×36 in size for taking a panoramic picture, and this panoramic photographing attachment includes a shading member to narrow the film aperture in the longitudinal direction, an auxiliary lens having positive refractive power to convert its focal length synthesized with the photographing lens to a focal length shorter than the individual focal length of the photographing lens without changing the positions of an image formation, and an auxiliary lens supporting means which supports the auxiliary lens at one end while having the aforesaid shading member mounted at the other end so as to position the shading member closely to the film aperture and to support the auxiliary lens at a predetermined position in the optical path between the photographing lens and the film aperture, and is constructed to enable a panoramic photographing with the installation of this auxiliary supporting means.

Further objectives, features, and effects of the present invention will be more apparent by reference to the following detailed description of the invention taken in conjunction with the accompanying drawings.

DESCRIPTION OF THE PREFERRED EMBODIMENTS

Hereinafter, the embodiments according to the present invention will be described in detail in reference to the accompanying drawings.

Figure 1A:
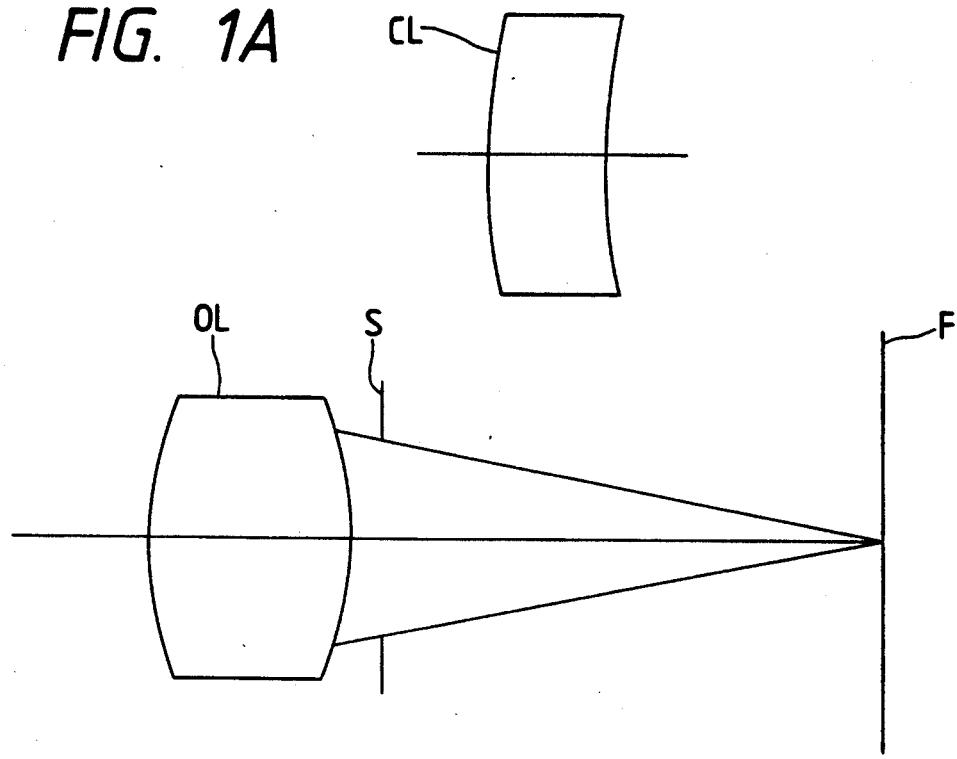
FIGS. 1A and 1B are views schematically illustrating the structure of the optical system according to the present invention.
Figure 1B:
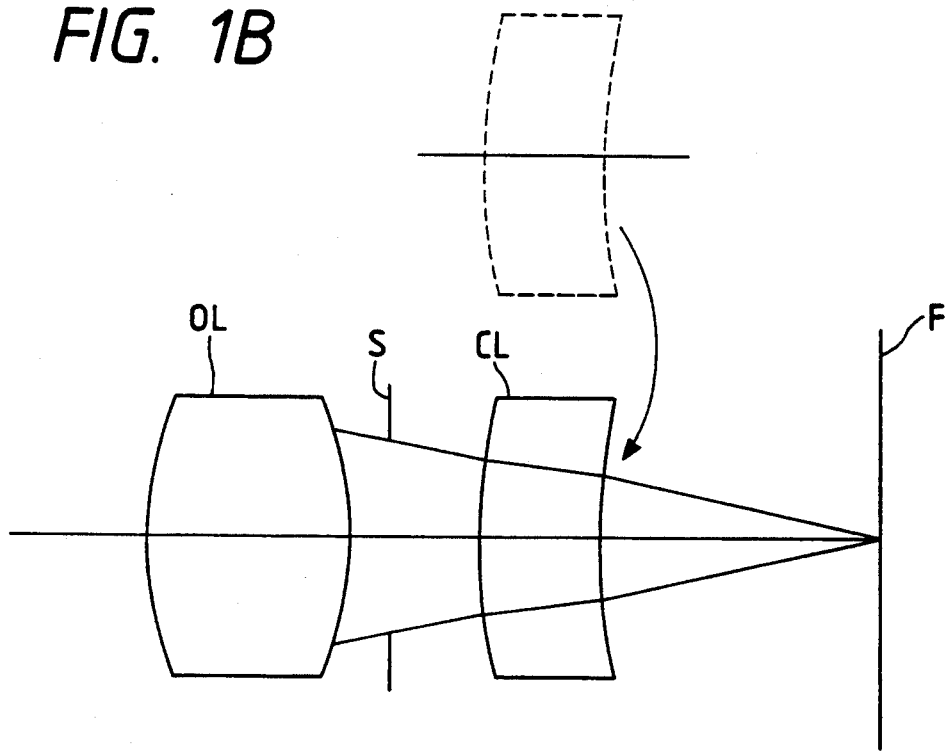

FIG. 1 illustrates the structure of an optical system constituting the principal part of the embodiment according to the present invention. In FIGS. 1A and 1B, FIG. 1A shows a state of a usual photographing by a photographing lens OL while FIG. 1B illustrates a state of a panoramic photographing with an auxiliary lens CL being added.

In a usual photographing state shown in FIG. 1A, the beam of light having passed through the photographing lens OL and aperture diaphragm S reaches the image plane (film surface) F as it is to form an image. At this juncture, the auxiliary lens CL is detracted from the optical path of the photographing lens OL. Then, when the auxiliary lens CL is installed in the optical path of the photographing lens OL as shown in FIG. 1B, the photographing condition is shifted to the panoramic photographing. In this instance, with the positive refractive power and appropriate axial thickness of the auxiliary lens CL, the synthesized focal length produced by the installation of the auxiliary lens CL in the optical path between the photographing lens OL and image plane F is made shorter than the individual focal length of the photographing lens, and an object can be focused at a predetermined position on the image plane F without moving the photographing lens OL even when the auxiliary lens CL is installed.

As a result, in a camera according to the present invention, the total length of the photographing optical system is almost the same as that of the conventional single lens camera even in a state of panoramic photographing and has an extremely significant advantage.

Figure 2:
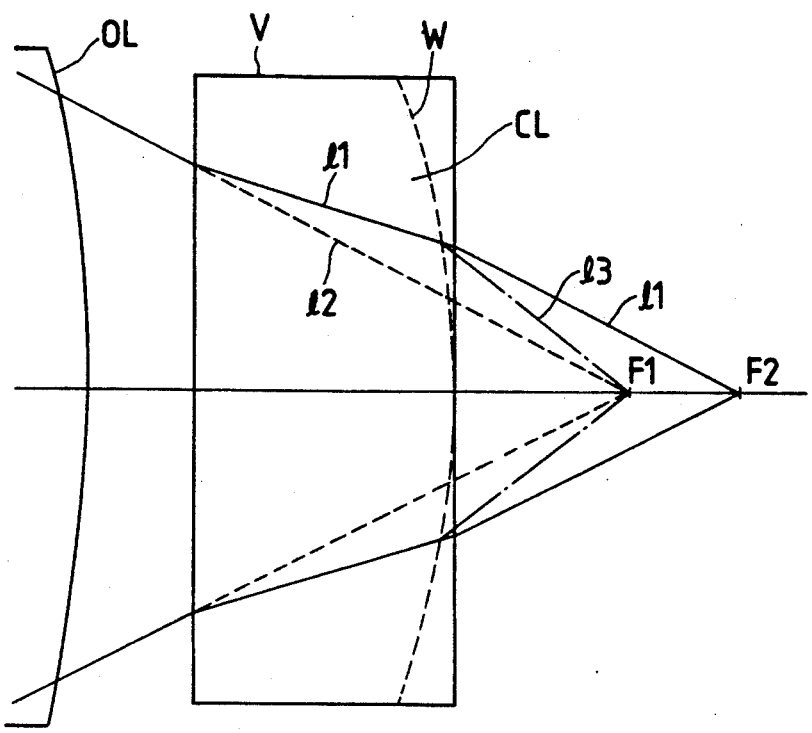
FIG. 2 is a view illustrating the principle of the optical system according to the present invention.

FIG. 2 is a schematic view illustrating the principle of an invariant image plane. In FIG. 2, when a thick parallel flat plate V is installed between a photographing lens OL and its focus F1, the focus moves from F1 to F2 in accordance with the product of the refraction index of the parallel flat plate V and it thickness, i.e., optical thickness, and the beam of light converging at the focus F1 as indicated by broken lines 12 is shifted to converge at the focus F2 as indicated by solid lines 11.

However, if one face of the parallel flat plate V is formed to be a lens having an appropriate curvature at W, the refractive function of such curvature causes an image to be formed at the focus F1 as indicated by dashed lines 13. In other words, the synthesized focal length can be made shorter than the focal length of the photographing lens OL. For this reason, it is possible to restrict the movement of the focus resulting from the installation or removal of the auxiliary lens CL.

As set forth above, the present invention obtains the panoramic photographing condition by shortening the synthesized focal length. However, there is a limit to shortening the synthesized focal length. In other words, the assured angles of view of the photographing lens OL are within the maximum angle of view containing the diagonal line of the usual Leica size, and with angles of view beyond the maximum, it is impossible to anticipate a good image formation due to aberration. Also, luminous intensity in the circumference is significantly reduced to result in the image shading. As to the image forming performance, it is conceivable to make correction by the auxiliary lens CL. Then, problems are encountered in that the structure of the auxiliary lens CL becomes complicated and its size becomes larger, leading to the increased cost as well as the larger size of the camera as a whole.

The present invention, therefore, defines the limit of the synthesized focal length by a conditional expression (1) given below when the auxiliary lens is installed.

$$0.83 < fp/fm < 0.95 \qquad (1)$$

where fp: synthesized focal length when the auxiliary lens is installed.

fm: focal length of the photographing lens. Beyond the lower limit of the conditional expression (1), it is difficult to correct aberration in the panoramic condition. On the contrary, exceeding the upper limit, the effect on widening the angle of view becomes insufficient.

Figure 6:
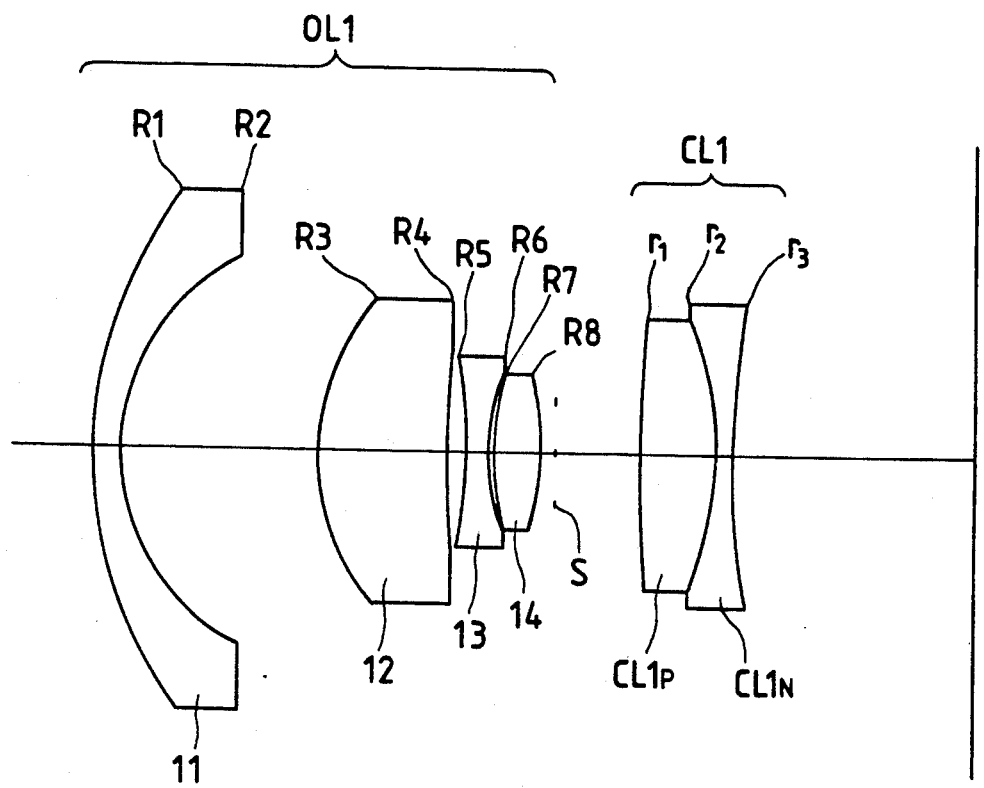
FIG. 6 is a view showing the lens structure of a first embodiment according to the present invention.

It is preferable to construct the auxiliary lens CL with only two pieces of lenses such that a positive biconvex lens and a negative biconcave lens are coupled as shown in a sixth embodiment illustrated in FIG. 6 although it may be possible to employ a positive single lens. Also, as the coupled lenses can be handled in the same manner as a single lens, the simplification of the supporting member and a mechanism to install or remove the lens can be anticipated.

In the case where the auxiliary lens is constructed by coupling the biconvex lens and biconcave lens sequentially from the object side, it is preferable to satisfy the conditional expressions (2) to (5) given below.

$$0.25 < \frac{fm - fp}{d1 \cdot n1 + d2 \cdot n2} < 0.38 \qquad (2)$$

$$0.08 < n1 - n2 < 0.23 \qquad (3)$$

$$1.9 < r1/r3 \cdot < 2.5 \qquad (4)$$

$$4 < v1 - v2 < 9 \qquad (5)$$

where
fm: individual focal length of a photographing lens.
fp: synthesized focal length of the photographing lens and an auxiliary lens in panoramic photographing condition.
d1 and d2: axial thickness of a biconvex lens and biconcave lens respectively.
n1 and n2: refraction index of the biconvex lens and biconcave lens respectively with respect to d-Line.
r1 and r3: radius of curvature of the biconvex lens on its surface facing an object and biconcave lens on its surface facing the image formation plane respectively.
v1 and v2: Abbe number of the biconvex lens and biconcave lens respectively.

With the conditional expression (2), an appropriate lens thickness of the auxiliary lens is regulated for obtaining the panoramic photographing condition. In exceeding the upper limit of this conditional expression (2), its lens thickness becomes too thick as compared with the positive refractive power and when the auxiliary lens is installed, the focus thereof is shifted towards the object side more than the focusing position before the installation thereof. Also, in a case of panoramic photographing, the synthesized focal length becomes too short. Accordingly, the auxiliary lens CL is positioned closely to the photographing lens OL, so that the restriction on the mechanism for installing and removing the auxiliary lens becomes greater. Also, in exceeding the lower limit, the lens thickness becomes too thick as compared with the refraction power. According, when the auxiliary lens is installed, the focus thereof is shifted towards the image plane side more than the focal position before the installation thereof. Also, the wide angle effect in the panoramic photographing becomes smaller and at the same time, the auxiliary lens CL being positioned closely to the image plane, the diameter of the auxiliary lens CL becomes greater.

With the conditional expression (3), the difference of the refractive indexes of the aforesaid biconvex lens and biconcave lens is defined, and this expression relates to the correction of the spherical aberration and image plane curvature. In exceeding the lower limit of the conditional expression (3), Petzval's sum increases positively to make the correction of sagittal image plane difficult while in exceeding the upper limit, the negative spherical aberration increases significantly.

The conditional expression (4) relates to the correction of frame aberration. Beyond the upper and lower limits of the conditional expression (4), the frame aberration is generated significantly, which is not desirable.

The objective of the conditional expression (5) is to perform a desirable correction of color aberration. In exceeding the upper limit of the conditional expression (5), the color aberration of positive magnification, i.e., the aberration to make an image greater if the rays of light are shorter, becomes conspicuous while in exceeding the lower limit on the contrary, it becomes difficult to correct the color aberration of negative magnification.

Figure 9:
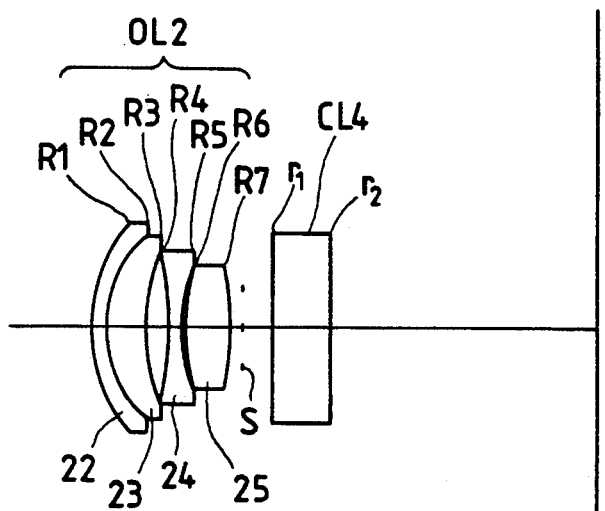
FIG. 9 is a view showing the lens structure of a fourth embodiment according to the present invention.

Now, in the present invention, it is possible to construct the auxiliary lens CL with a positive single lens as shown in an embodiment illustrated in FIG. 9 provided that the range of the synthesized focal length is too small when the auxiliary lens is installed. In this instance, the lower limit of the conditional expression (1) should preferably be 0.91 because the correction of each of the aberrations is extremely difficult. In addition, it is preferable to satisfy the conditional expressions (6) through (8) given below.

$$0.3 < \frac{fm - fp}{d \cdot n} < 0.4 \qquad (6)$$

$$-2 < \frac{r2 + r1}{r2 - r1} < 7 \qquad (7)$$

$$50 < n \cdot (v - 20) \qquad (8)$$

where
fm: individual focal length of a photographing lens.
fp: synthesized focal length of the photographing lens and an auxiliary lens in panoramic photographing condition.
d: axial thickness of a positive single lens.
n: refractive index of the positive single lens with respect to d-Line.
r1 and r2: radius of curvature of the positive single lens on its surface facing an object and on its surface facing the image formation plane respectively.

ν: Abbe number of the positive lens.

The conditional expression (6) corresponds to the conditional expression (2) where the auxiliary lens CL is constructed by the coupled lenses. Therefore, in exceeding the upper limit thereof, the focus of the auxiliary lens CL is shifted to the object side when it is installed more than its focus position before the installation thereof. Also, the synthesized focal length in a panoramic photographing becomes too short and as the auxiliary lens CL is positioned closely to the photographing lens OL, the restriction on the mechanism becomes greater. Then, in exceeding the lower limit, the focus is shifted to the image formation side more than the focus position before the installation, and not only the wide angle effect in the panoramic condition becomes smaller, but the diameter of the auxiliary lens CL becomes greater because the auxiliary lens CL is positioned closely to the image formation plane.

The conditional expression (7) relates to the correction of frame aberration and curvature aberration. Beyond the upper limit thereof, it becomes difficult to correct the negative curvature aberration while beyond the lower limit, the generation of the outward frame aberration is conspicuous.

The conditional expression (8) relates to the correction of color aberration. In a case of a single lens, it is impossible to correct the color aberration. There is even a possibility that the image formation performance is deteriorated particularly by the generation of the color aberration of negative magnification. However, it is possible to keep the generation of such aberration in an amount small enough by satisfying the conditional expression (8).

Hereinafter, the embodiments according to the present invention will be described further in detail. The first embodiment to the eighth embodiment of the present invention shown in FIGS. 6 through 13 are all of such a structure that an auxiliary lens CL is installed in the optical path between a photographing lens OL and an image formation plane as described above to convert the synthesized focal length to a focal length which is shorter than the individual focal length of the photographing lens, and that the auxiliary lens CL is retracted from the optical path of the photographing lens OL in the usual photographing condition.

Before describing each of the embodiments, the structure of three kinds of lenses, a master lens OL1, master lens OL2, and master lens OL3, which are used as the photographing lens OL, will be described.

Figure 3:
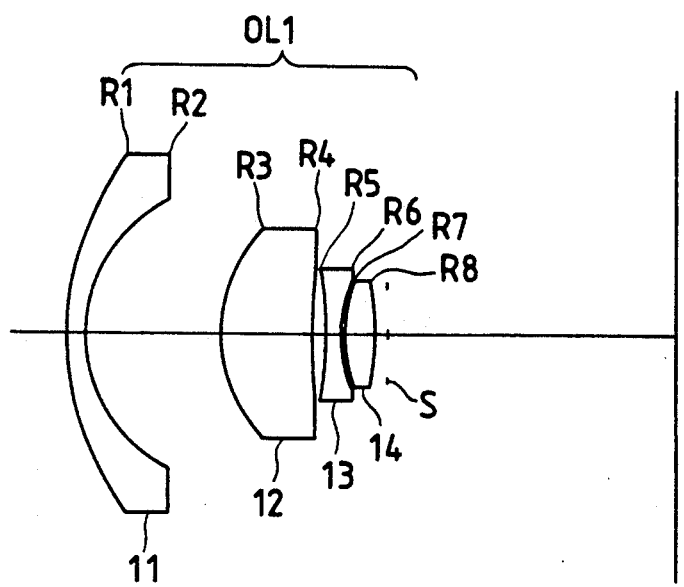
FIGS. 3, 4, and 5 are views respectively showing the lens structures of the masters 1, 2, and 3 as the photographing lenses to be combined with the auxiliary lens according to the present invention.

FIG. 3 illustrates the lens structure of the master lens OL1 which comprises sequentially from the object side a negative meniscus lens 11 with its convex plane facing the object side, a positive meniscus lens 12 with its convex plane facing the object side, a biconcave lens 13 and a biconvex lens 14.

Figure 4:
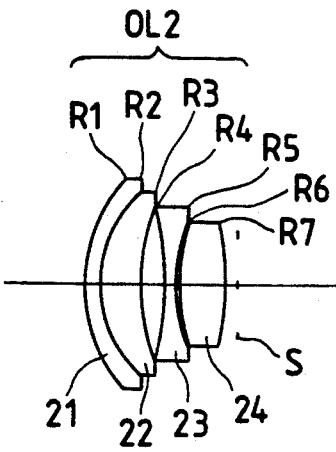

FIG. 4 illustrates the lens structure of the master lens OL2 which comprises sequentially from the object side a negative meniscus lens 21 with its convex plane facing the object side, a positive meniscus lens 22 with its convex plane facing the object side, a biconcave lens 23 and a biconvex lens 24.

Figure 5:
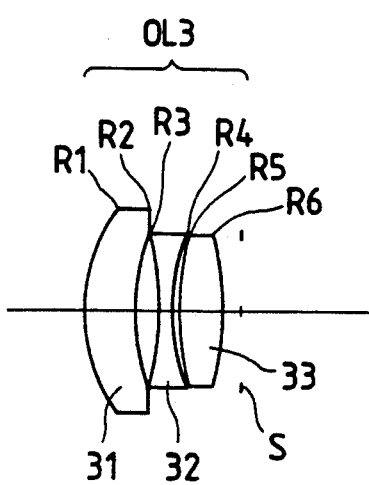

FIG. 5 illustrates the lens structure of the master lens OL3 which comprises sequentially from the object side a positive meniscus lens 31 with its convex plane facing the object side, a biconcave lens 32 and a biconvex lens 33.

The data of each of the master lenses are stated in the Table 1 through Table 3 given below.

In the following tables, the numbers shown at the left side end represent plane number from the object side; R and r, radii of curvature; d, surface interval; n, refractive index with respect to d-Line ($\lambda = 587.6$ nm); and ν, Abbe number. Also, the mark fm designates the focal length of a photographing lens; fp, the synthesized focal length at the time of a panoramic photographing with an auxiliary lens being installed; FN, F number; BF, back focus; and 2ω, an angle of view in Leica size.

TABLE 1

(Master lens OL1)

fm = 28.60
BF = 27.04
FN = 3.5
Angle of view in the usual Leica size 2ω = 73.9°

| | R | d | ν | n |
|---|---|---|---|---|
| 1 | 25.553 | 1.60 | 54.6 | 1.51454 |
| 2 | 12.897 | 12.10 | | |
| 3 | 13.541 | 8.00 | 47.5 | 1.78797 |
| 4 | 49.286 | 1.30 | | |
| 5 | −26.032 | 1.40 | 30.1 | 1.69895 |
| 6 | 12.046 | 0.40 | | |
| 7 | 19.311 | 2.70 | 45.4 | 1.79668 |
| 8 | −19.311 | 27.04 | | |

TABLE 2

(Master lens OL2)

fm = 28.35
BF = 22.90
FN = 4.0
Angle of view in the usual Leica size 2ω = 74.2°

| | R | d | ν | n |
|---|---|---|---|---|
| 1 | 9.408 | 0.90 | 40.7 | 1.58144 |
| 2 | 7.214 | 2.60 | 54.7 | 1.72916 |
| 3 | 13.406 | 1.20 | | |
| 4 | −21.962 | 0.90 | 31.1 | 1.68893 |
| 5 | 9.368 | 0.30 | | |
| 6 | 13.614 | 2.70 | 39.6 | 1.80454 |
| 7 | −18.452 | 22.90 | | |

TABLE 3

(Master lens OL3)

fm = 34.48
BF = 29.70
FN = 3.5
Angle of view in the usual Leica size 2ω = 64.4°

| | R | d | ν | n |
|---|---|---|---|---|
| 1 | 10.080 | 3.30 | 55.5 | 1.69680 |
| 2 | 14.734 | 1.17 | | |
| 3 | −20.732 | 1.00 | 34.6 | 1.63980 |
| 4 | 11.755 | 0.47 | | |
| 5 | 19.201 | 2.60 | 46.5 | 1.80420 |
| 6 | −19.201 | 29.70 | | |

Subsequently, the description will be made of the embodiments wherein an auxiliary lens is installed in each of the master lenses.

A first embodiment is of such a structure that an auxiliary lens CL1 is installed in the master lens OL1 as shown in FIG. 6, comprising sequentially from the object side the master lens OL1, and the auxiliary lens CL1 which is a coupled lens of biconvex lens CL1p and biconcave lens $CL1_N$. Also, the lens data therefor are stated in Table 4.

Figure 7:
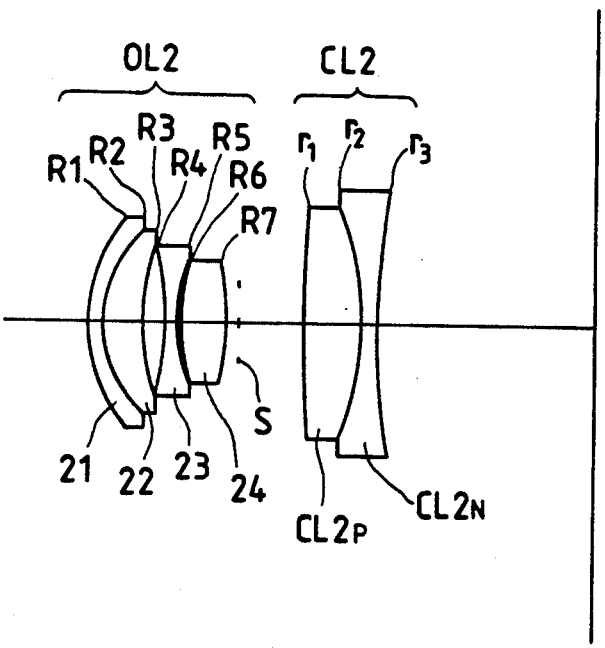
FIG. 7 is a view showing the lens structure of a second embodiment according to the present invention.

A second embodiment is of such a structure that an auxiliary lens is installed in the master lens OL2 as shown in FIG. 7, comprising sequentially from the object side the master lens OL2, and the auxiliary lens CL2 which is a coupled lens of biconvex lens CL2p and biconcave lens CL2$_N$. Also, the data for the auxiliary lens CL2 are stated in Table 5.

Figure 8:
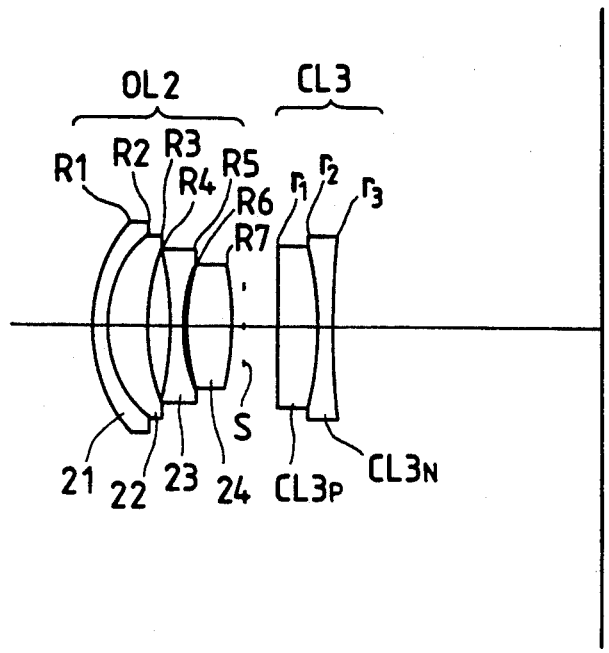
FIG. 8 is a view showing the lens structure of a third embodiment according to the present invention.

A third embodiment is of such a structure that an auxiliary lens CL3 is installed in the master lens OL2 as shown in FIG. 8, comprising sequentially from the object side the master lens OL2, and the auxiliary lens CL3 which is a coupled lens of biconvex lens CL3p and biconcave lens CL3$_N$. Also, the data for the auxiliary lens CL3 are stated in Table 6. In this third embodiment, the miniaturization of the auxiliary lens is implemented by making the synthesized focal length fp longer than the second embodiment when the auxiliary lens is installed.

A fourth embodiment is of such a structure that an auxiliary lens CL4 is installed in the master lens OL2 as shown in FIG. 9, comprising sequentially from the object side the master lens OL2, and the auxiliary lens CL4 which is a biconvex lens. Also, the data for the auxiliary lens CL4 are stated in Table 7.

Figure 10:
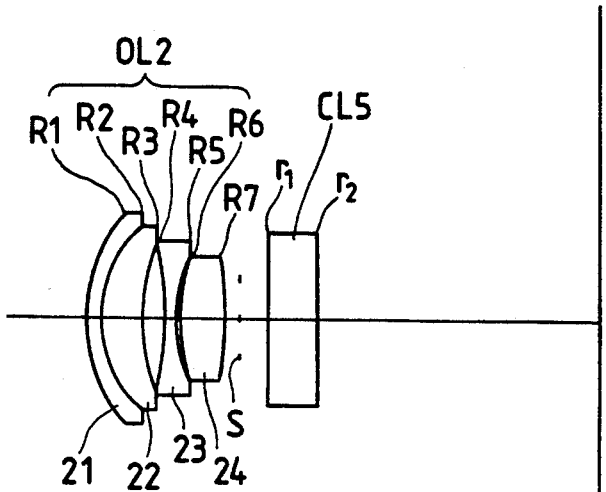
FIG. 10 is a view showing the lens structure of a fifth embodiment according to the present invention.

A fifth embodiment is of such a structure that an auxiliary lens CL5 is installed in the master lens OL2 as shown in FIG. 10, comprising sequentially from the object side the master lens OL2, and the auxiliary lens CL5 which is a flat convex lens. Also, the data for the auxiliary lens CL5 are stated in Table 8. In this fifth embodiment, the axial thickness of the auxiliary lens is thin because the refractive index of the auxiliary lens is high as compared with the fourth embodiment.

Figure 11:
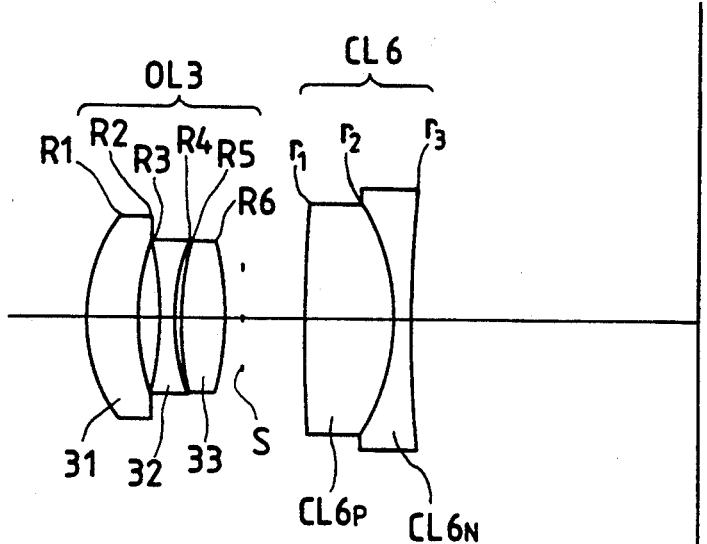
FIG. 11 is a view showing the lens structure of a sixth embodiment according to the present invention.

A sixth embodiment is of such a structure that an auxiliary lens CL6 is installed in the master lens OL3 as shown in FIG. 11, comprising sequentially from the object side the master lens OL3, and the auxiliary lens CL6 which is a coupled lens of a biconvex lens CL6p and a biconcave lens CL6$_N$. Also, the data for the auxiliary lens CL6 are stated in Table 9.

Figure 12:
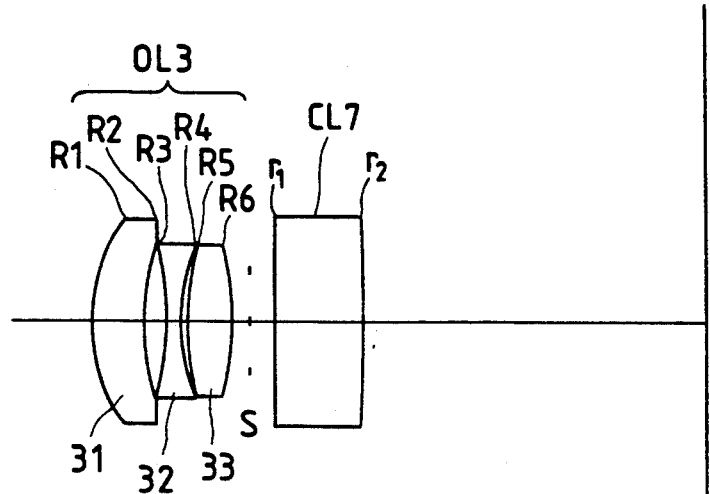
FIG. 12 is a view showing the lens structure of a seventh embodiment according to the present invention.

A seventh embodiment is of such a structure that an auxiliary lens CL7 is installed in the master lens OL3 as shown in FIG. 12, comprising sequentially from the object side the master lens OL3, and the auxiliary lens CL7 which is a flat convex lens. Also, the data for the auxiliary lens CL7 are stated in Table 10.

In this respect, the auxiliary lens CL7 according to the seventh embodiment is an aspherical plastic lens. In general, a plastic material is low in its refractive index, and while it is difficult for a spherical plastic lens to correct aberration, it is possible to obtain the performance which is the same as or better than a spherical glass lens by employing an aspherical shape. In the Table 10, the aspherical plane is indicated by mark *, which can be expressed in the following equation:

$$X = (y^2/r)\{1 + (1 - ky^2/r^2)^{1/2}\}$$

where:
X Depth of plane in the axial direction.
y: Height from the optical axis.
r: Standard radius of curvature.
k: Coefficient of the aspherical plane.

Figure 13:
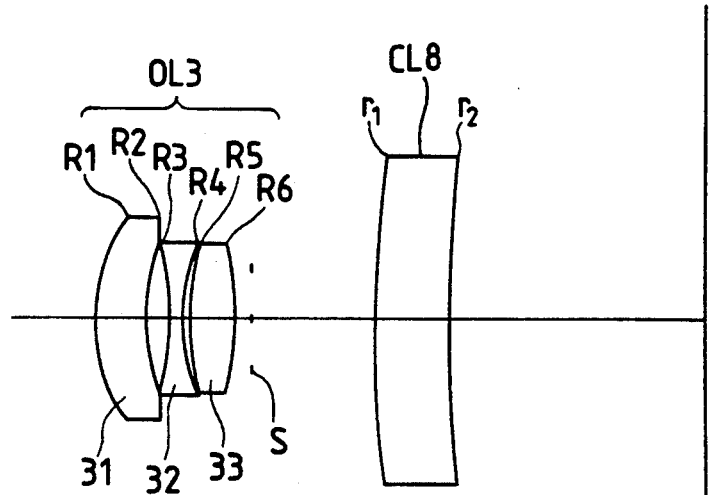
FIG. 13 is a view showing the lens structure of a eighth embodiment according to the present invention.

An eighth embodiment is of such a structure that an auxiliary lens CL8 is installed in the master lens OL3 as shown in FIG. 13, comprising sequentially from the object side the master lens OL3, and the auxiliary lens CL8 which is a positive meniscus lens having its convex plane towards the object side. Also, the data for the auxiliary lens CL8 are stated in Table 11. In a case of a single lens, it is better in general to employ a meniscus shape in consideration of the correction of its spherical aberration and frame aberration. However, there are drawbacks that the correction of a negative curvature aberration is difficult or the lens diameter becomes great. Nevertheless, in this eighth embodiment, the aforesaid problem has been solved to a certain extent by increasing the refractive index of the auxiliary lens CL8.

Hereinafter, the lens data for each of the auxiliary lenses according to the respective embodiments are shown, in which a reference mark fp indicates a synthesized focal length. Also, in each of the tables given below, the back-focus BF, F number FN, and angle of view 2ω in a panoramic condition are values in a panoramic state, respectively. Furthermore, the lens interval represented by the surface number 0 is an air space with a master lens.

TABLE 4

(1st embodiment combined with OL1)

fp = 25.50
BF = 15.10
FN = 4.0
Panoramic angle of view 2ω = 74.4°

Auxiliary lens CL1

| | r | d | ν | n |
|---|---|---|---|---|
| 0 | | 6.25 | | |
| 1 | 103.765 | 4.70 | 45.4 | 1.79668 |
| 2 | −20.088 | 1.00 | 38.1 | 1.60342 |
| 3 | 48.844 | 15.10 | | |

Conditional corresponding value
fp/fm = 0.892

$$\frac{fm - fp}{d1 \cdot n1 + d2 \cdot n2} = 0.308$$

n1 − n2 = 0.193
r1/r3 = 2.124
ν1 − ν2 = 7.3

TABLE 5

(2nd embodiment combined with OL2)

fp = 25.60
BF = 13.50
FN = 4.5
Panoramic angle of view 2ω = 73.6°

Auxiliary lens CL2

| | r | d | ν | n |
|---|---|---|---|---|
| 0 | | 4.90 | | |
| 1 | 96.484 | 3.50 | 45.4 | 1.79668 |
| 2 | −18.427 | 1.00 | 40.3 | 1.60717 |
| 3 | 44.574 | 13.50 | | |

Conditional corresponding value
fp/fm = 0.903

$$\frac{fm - fp}{d1 \cdot n1 + d2 \cdot n2} = 0.348$$

n1 − n2 = 0.190
r1/r3 = 2.165
ν1 − ν2 = 5.1

TABLE 6

(3rd embodiment combined with OL2)

fp = 26.49
BF = 16.60
FN = 4.7
Panoramic angle of view 2ω = 71.5°

Auxiliary lens CL3

| | r | d | ν | n |
|---|---|---|---|---|
| 0 | | 2.80 | | |
| 1 | 141.778 | 2.50 | 47.5 | 1.78797 |
| 2 | −24.392 | 1.00 | 40.3 | 1.60717 |

TABLE 6-continued (3rd embodiment combined with OL2)

| | | |
|---|---|---|
| 3 | 60.209 | 16.60 |

Conditional corresponding value
fp/fm = 0.934

$$\frac{fm - fp}{d1 \cdot n1 + d2 \cdot n2} = 0.306$$

n1 − n2 = 0.181
r1/r3 = 2.355
ν1 − ν2 = 7.2

TABLE 7

(4th embodiment combined with OL2)

fp = 26.49
BF = 16.60
FN = 4.7
Panoramic angle of view 2ω = 73.3°

Auxiliary lens CL4

| | r | d | ν | n |
|---|---|---|---|---|
| 0 | | 2.60 | | |
| 1 | 281.000 | 3.70 | 64.1 | 1.51680 |
| 2 | −281.000 | 16.60 | | |

Conditional corresponding value
fp/fm = 0.934

$$\frac{fm - fp}{d \cdot n} = 0.330$$

$$\frac{r2 + r1}{r2 - r1} = 0$$

$n \cdot (\nu - 20) = 66.89$

TABLE 8

(5th embodiment combined with OL2)

fp = 26.50
BF = 17.35
FN = 4.7
Panoramic angle of view 2ω = 73.1°

Auxiliary lens CL5

| | r | d | ν | n |
|---|---|---|---|---|
| 0 | | 2.60 | | |
| 1 | ∞ | 2.95 | 55.6 | 1.69680 |
| 2 | −186.024 | 17.35 | | |

Conditional corresponding value
fp/fm = 0.935

$$\frac{fm - fp}{d \cdot n} = 0.370$$

$$\frac{r2 + r1}{r2 - r1} = -1$$

$n \cdot (\nu - 20) = 60.41$

TABLE 9

(6th embodiment combined with OL3)

fp = 30.48
BF = 18.00
FN = 4.5
Panoramic angle of view 2ω = 65.7°

Auxiliary lens CL6

| | r | d | ν | n |
|---|---|---|---|---|
| 0 | | 5.20 | | |
| 1 | 159.715 | 5.50 | 43.3 | 1.84042 |
| 2 | −12.742 | 1.00 | 38.0 | 1.72342 |
| 3 | 76.742 | 18.00 | | |

Conditional corresponding value
fp/fm = 0.884

TABLE 9-continued (6th embodiment combined with OL3)

$$\frac{fm - fp}{d1 \cdot n1 + d2 \cdot n2} = 0.337$$

n1 − n2 = 0.117
r1/r3 = 2.081
ν1 − ν2 = 5.3

TABLE 10

(7th embodiment combined with OL3)

fp = 31.80
BF = 21.50
FN = 4.6
Panoramic angle of view 2ω = 64.0°

Auxiliary lens CL7

| | r | d | ν | n |
|---|---|---|---|---|
| 0 | | 2.70 | | |
| 1 | ∞ | 5.50 | 57.6 | 1.49108 |
| 2* | −135.935 | 21.50 | | | k = +148.0

Conditional corresponding value
fp/fm = 0.922

$$\frac{fm - fp}{d \cdot n} = 0.326$$

$$\frac{r2 + r1}{r2 - r1} = -1$$

$n \cdot (\nu - 20) = 56.06$

TABLE 11

(8th embodiment combined with OL3)

fp = 31.80
BF = 16.20
FN = 4.6
Panoramic angle of view 2ω = 63.7°

Auxiliary lens CL8

| | r | d | ν | n |
|---|---|---|---|---|
| 0 | | 8.80 | | |
| 1 | 69.140 | 4.70 | 54.0 | 1.71300 |
| 2 | 95.370 | 16.20 | | |

Conditional corresponding value
fp/fm = 0.922

$$\frac{fm - fp}{d \cdot n} = 0.332$$

$$\frac{r2 + r1}{r2 - r1} = 6.271$$

$n \cdot (\nu - 20) = 58.24$

According to the embodiment set forth above, while the master lens OL1 has an angle of view, 73.9°, in the usual Leica size, it has an angle of view of only 67° in the panoramic size which is produce by the usual shading member. Now, if the auxiliary lens CL1 shown in the Table 4 is installed on the image formation side of the master lens OL1, an angle of view of 2ω, 74.4°, which is more than the angle of view obtainable by the usual photographing lens, can be obtained.

In this instance, the plane interval d between the last plane of the master lens OL1 and the first plane of the auxiliary lens CL1 is d=6.25 as stated in the upper part (No. 0) of the Table 4.

The master lens OL2 has an angle of view, 74.2°, on the diagonal line in the usual Leica size. However, it has an angle of view of only 67° on the diagonal line in the panoramic size produced by the usual shading member. Now, if auxiliary lens CL2, CL3, CL4, and CL5 shown respectively in Table 5, Table 6, Table 7, and Table 8 are installed on the image formation side of the master lens OL2, the angles of view on the diagonal line in the panoramic size show respectively a value of 73.6°, 71.5°, 73.3°, and 73.1°, thus making it possible to obtain the same angles of view 2ω as the photographing lens in the usual Leica size.

In this case, the plane intervals d between the last plane of the master lens OL2 and each of the auxiliary lenses is d=4.90, 2.80, 2.60, and 2.60 as stated respectively in the upper part (No. 0) of Table 5, Table 6, Table 7, and Table 8.

The master lens OL3 has an angle of view, 64.4°, in the usual Leica size. However, it has an angle of view of only 58° on the diagonal line in the panoramic size produced by the usual shading member. Now, if auxiliary lens CL6, CL7, and CL8 shown respectively in Table 9, Table 10, and Table 11 are installed on the image formation side of the master lens OL3, the angles of view on the diagonal line in the panoramic size show respectively a value of 65.7°, 64.0°, and 63.7°, thus making it possible to obtain the angle of view 2ω which is more than the photographing lens in the usual Leica size.

In this case, the surface intervals d between the last surface of the master lens OL3 and each of the auxiliary lenses is d=5.20, 2.70, and 8.80 as stated respectively in the upper part (No. 0) of Table 9, Table 10, and Table 11.

With the installation of the above-mentioned auxiliary lenses, the focal length can be shortened by approximately 10% to implement the effective panoramic changes.

In this respect, the single focus lens is adopted as a photographing lens in the embodiments. This adoption is made only for convenience' sake, and a zoom lens, for example, can be adopted instead as a matter of course.

Figure 14:
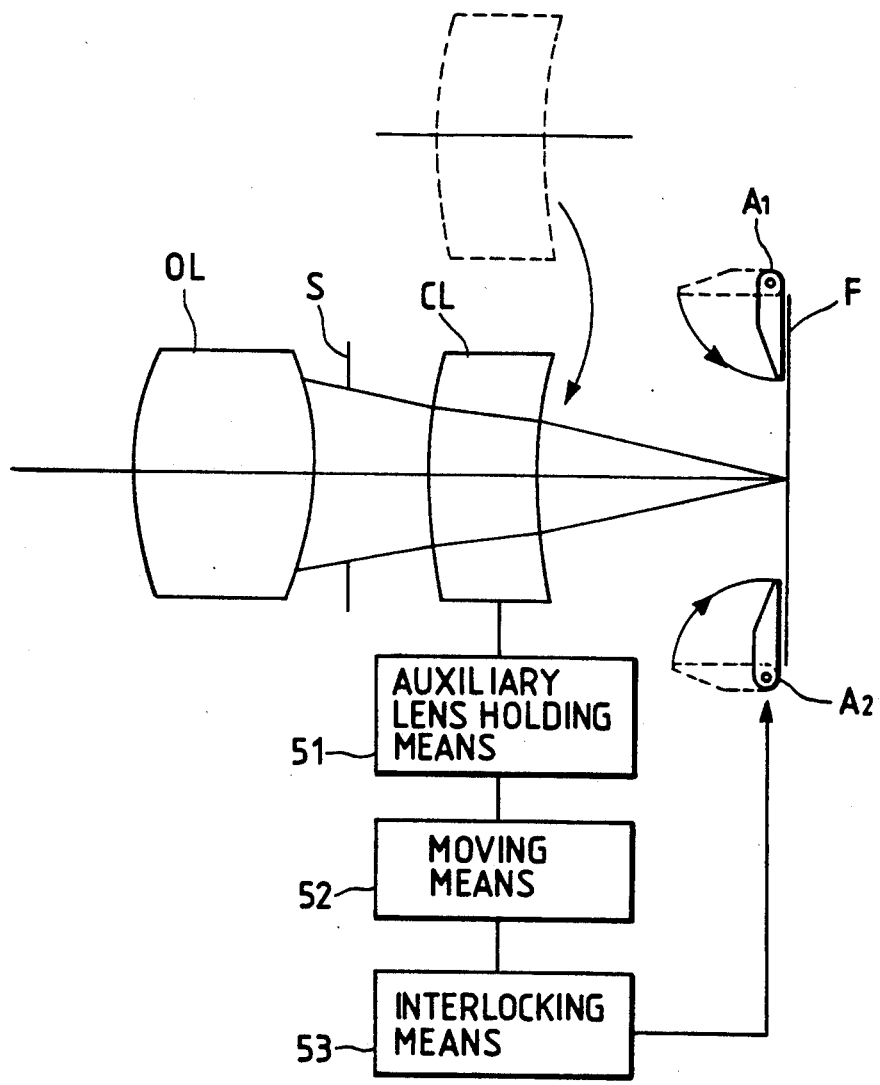
FIG. 14 is a view schematically showing the structure of the eighth embodiment of the present invention using a shading means.

Now, for the present invention, whether the film aperture is shaded or not as shown in FIG. 14 is not an essential problem. It may be possible to adopt a mask of panoramic size when printing, for example. However, in the case of the present invention where a short focusing is attempted in a panoramic size, it is absolutely necessary to register on a film a mark with which to discriminate whether the photographing is in the panoramic size or not. Otherwise there is a possibility that a usual print is produced with an eclipse at each of the four corners thereof. As such a discriminating means, it is effective to shift from the usual Leica size to the panoramic size by providing movable shading members A in the vicinity of a film F illustrated in FIG. 14 as one of the embodiments according to the present invention. In this case, the structure is arranged in such a manner that the auxiliary lens CL supported by a supporting means 51 is installed in the optical path by a driving means 52 to perform the conversion to the panoramic state, and that a pair of upper and lower shading members A1 and A2 are rotated by an interlocking means 53 so as to position them just in front of the film F.

Figure 15:
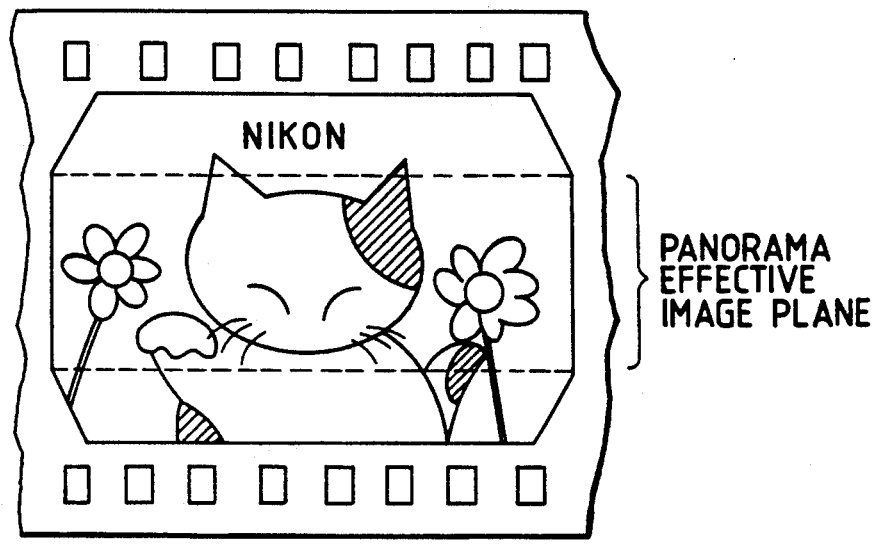
FIG. 15 is an enlarged illustration of a film representing an example of means to discriminate a panoramic photographing film.

While shading actually the aperture section vertically by the shading members A1 and A2 is an effective means to discriminate the panoramic state as described above, it may be possible to make an arrangement with the Labo side as some other means to discriminate the panoramic state. For example, it may be conceivable to provide some marking such as the name of a camera with which to performing the photographing ("NIKON", for example) on the part outside the image area in a panoramic photographing as shown in FIG. 15. In any event, it may suffice if some means is removably provided to register an indication of the panoramic state on a film outside its image formation plane.

Figure 16:
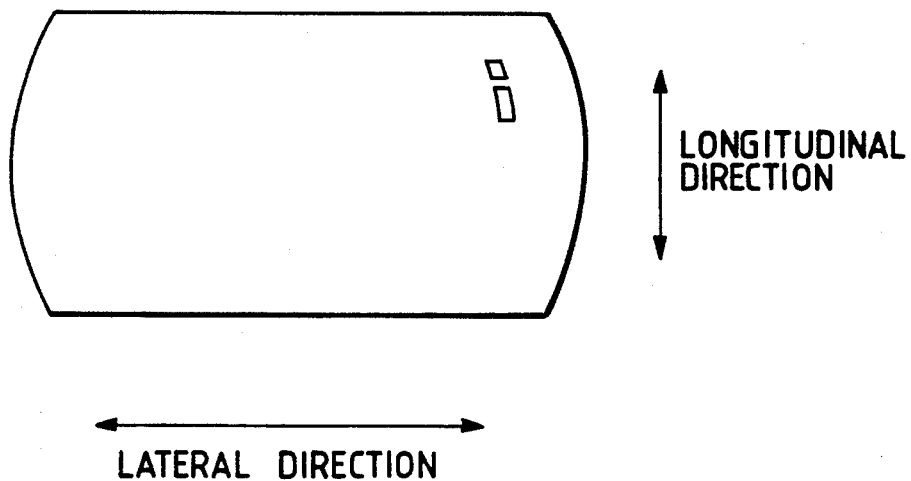
FIG. 16 is a plan view illustrating an example of the shape of an auxiliary lens.

In this respect, the diameter of an auxiliary lens CL in the schematic view showing each of the embodiments seems to be great, but the diameter represented therein is an effective diameter in the direction of the diagonal line in a panoramic size. In the longitudinal direction, the diameter can be much smaller. Therefore, as shown in FIG. 16, it is preferable to make the shape of an auxiliary lens CL almost oblong for miniaturizing the auxiliary lens which is actually incorporated in a camera body.

According to the present invention as set forth above, the wide angle arrangement in the panoramic size can be implemented by installing an auxiliary lens between a master lens and the image formation plane without changing the distances therebetween, and further, the provision of a camera having an appropriate angle of view in the usual format is possible at a low cost without making the entire body of the camera large.

Here, according to the above descriptions, the panoramic size is obtained by installing the auxiliary lens, but it is still possible to perform a panoramic photographing by providing a shading member and others in a state where the auxiliary lens is retracted, and if only an arrangement is made so as to perform the installation and removal of the auxiliary lens freely, it becomes possible to enjoy photographing effects by two different focal lengths for a richer image representation.

Figure 17:
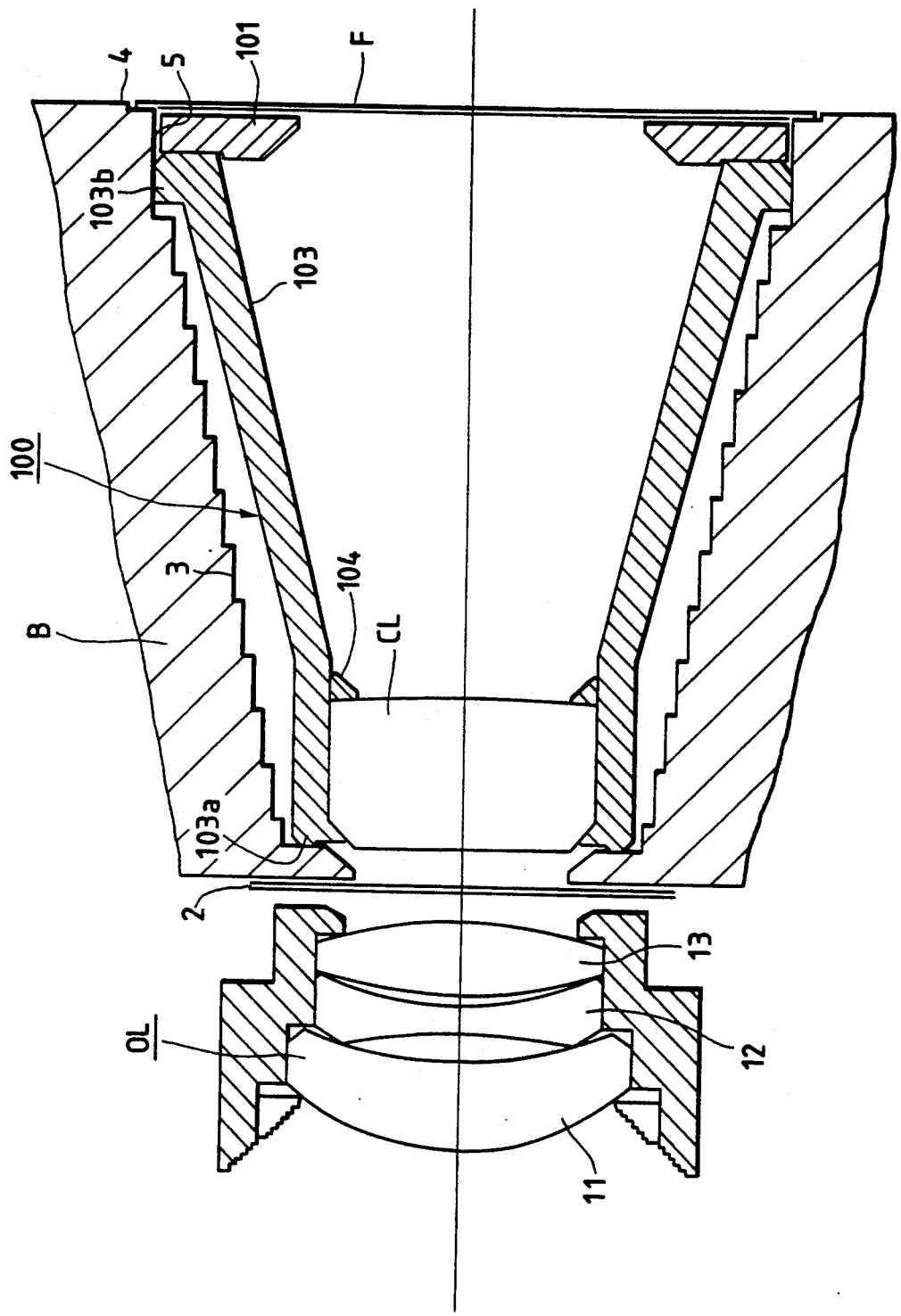
FIG. 17 is a cross-sectional view illustrating an embodiment of a panoramic photographing attachment according to the present invention.
Figure 18:
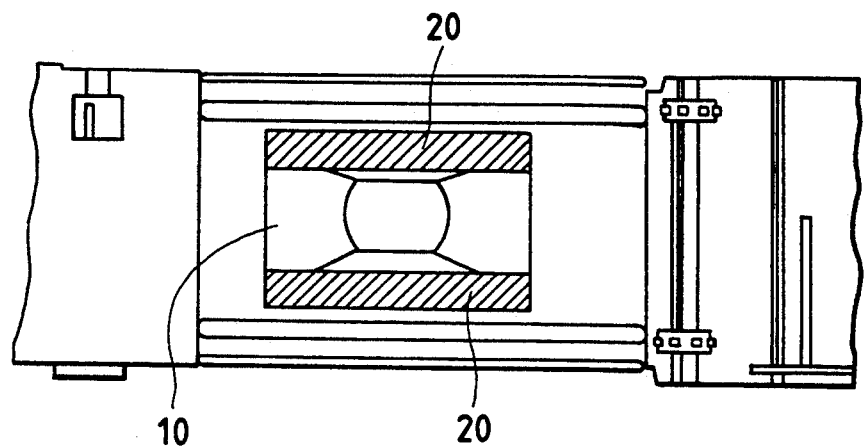
FIG. 18 is a plan view illustrating a state where the panoramic photographing attachment shown in FIG. 17 is installed.
Figure 20:
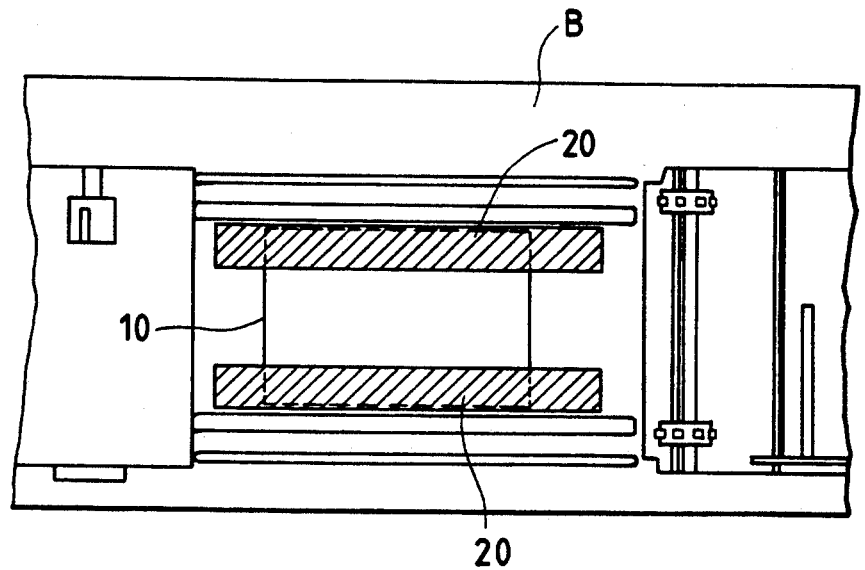
FIG. 20 is a plan view illustrating a state where the film aperture of a conventional Leica size camera is modified into an aperture of a panoramic size.
Figure 19A:
FIG. 19A is a plan view showing an example of a picture taken by a panoramic photographing.
Figure 19B:
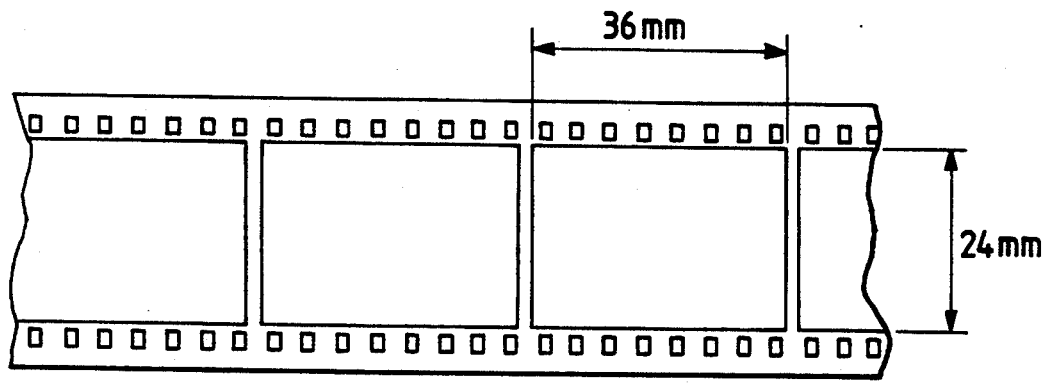
FIG. 19B is a plan view illustrating a film with a Leica size frames.
Figure 19C:
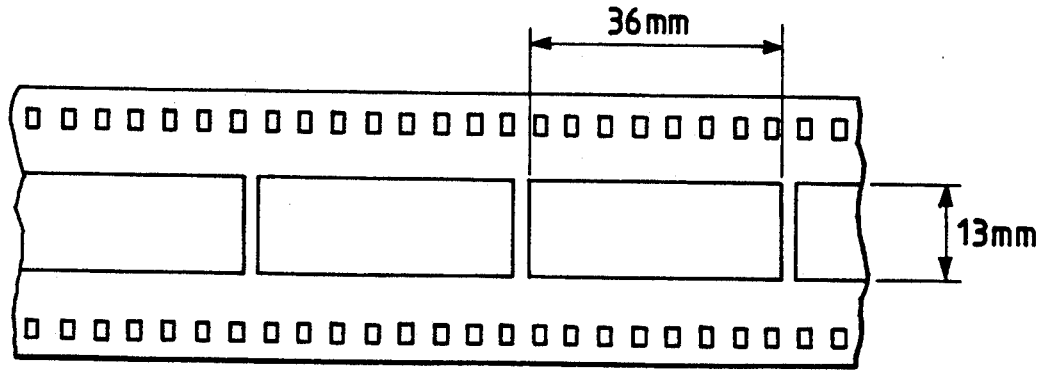
FIG. 19C is a plan view illustrating a film with a panoramic size frame.

FIG. 17 is a cross-sectional view schematically showing the structure of an attachment for the panoramic photographing having an auxiliary lens according to the present invention. Also, FIG. 18 is a plan view illustrating a state where the attachment of the present invention is inserted into the camera, which is observed from the film plane side In FIG. 17, the panoramic attachment 100 is incorporated inside the inner wall 3 of the body B of a lens shutter camera having a sector 2 behind its photographing lens OL, in which a shutter combined with a diaphragm are provided. This panoramic attachment 100 comprises a shading member 101 provided near the film guide rail 4 formed in the camera body B for restricting the longitudinal direction of the film aperture 5, an auxiliary lens CL with positive refractive power which is arranged in the optical path of a photographing lens OL, a lens supporting member 103 to couple them for the integration thereof, and a lens holding member 104 for fixing the auxiliary lens CL. The shading member 101 is adhesively fixed to the lens supporting member 103. Each of these constituents has the following function:

The shading member 101 is a visual field diaphragm for forming a panoramic field of view on the film plane by restricting the longitudinal direction of the film aperture 5. The auxiliary lens CL having positive refractive power serves to function as a rear converter for widening the angle of view for the panoramic photographing by positoning it in the optical path of the photographing lens OL to shorten the focal length synthesized thereby. In general, the installation and removal of a rear converter usually cause the focal position to be shifted. Therefore, it is impossible to incorporate an auxiliary lens having such function in a conventional camera unless its photographing lens is moved. However, with a structure which enables the auxiliary lens to be provided with an appropriate positive refractive power and an appropriate optical thickness, it is possible to remain the focal position unchanged even when such an auxiliary lens in incorporated therein.

The lens supporting member 103 serves to couple the above-mentioned shading member 101 and the auxiliary lens CL for the integration thereof so that it functions to allow the integrated member to be incorporated in the camera body B with ease, and at the same time, the supporting member is structured to be in contact with the inner wall 3 of the camera body by a coupling section 103a projected from the leading edge of the auxiliary lens side in the direction parallel to the optical axis and a coupling section 103b projected from the outer side face of the shading member in the direction perpendicular to the optical axis, thus serving to secure the accurate positioning of the shading member 101 and auxiliary lens CL with respect to the camera body B. In FIG. 17, the positions of the coupling sections 103a and 103b are defined as described above, the positions can arbitrarily defined in accordance with the construction of the camera body B. The lens holding member 104 serves to fix the auxiliary lens CL to the lens supporting member 103. This panoramic attachment 100 is inserted into the camera body from the film plane side after the rear cover (not shown) of the camera body B has been opened. Accordingly, the transversely cross-sectional shape of the panoramic attachment 100 is formed smaller than the film aperture 5.

According to the embodiment of the present invention shown in FIG. 17 as set forth above, the wide angle photographing in a panoramic size can be implemented with the installation of an auxiliary lens between a master lens and an image without changing the distance therebetween greatly and further the provision of a camera having an appropriate angle of view in the usual format is possible without making the entire body of such a camera large. Also, this system being an attachment, it is unnecessary to purchase any panorama camera anew. It is possible to obtain a panoramic effect easily just by inserting this into a conventional camera. Hence, this is a panoramic system best suited for beginners.

What is claimed is:

1. An optical apparatus capable of performing a panoramic photographing, including the following:
    a photographing lens for forming an image on an image plane;
    an auxiliary lens having positive refractive power for converting its focal length synthesized with said photographing lens to be a focal length shorter than the individual focal length of the photographing lens; and
    an auxiliary lens supporting means for supporting said auxiliary lens in such a manner that the auxiliary lens is installed in or removed from the optical path between said photographing lens and said image plane.

2. An optical apparatus according to claim 1, wherein said auxiliary lens is structured to satisfy the condition given below where the synthesized focal length of said auxiliary lens and said photographing lens is fp and the focal length of said photographing lens is fm:

$$0.83 < fp/fm < 0.95.$$

3. An optical apparatus according to claim 2, wherein said auxiliary lens is structured to satisfy the condition given below where the optical thickness of said auxiliary lens is $d_0$, the focal length of said photographing lens, fm, and the synthesized focal length of said auxiliary lens and photographing lens, fp:

$$0.25 < \frac{fm - fp}{d_0} < 0.4.$$

4. An optical apparatus according to claim 3, wherein said auxiliary lens is a coupled lens in which a positive lens and a negative lens are coupled sequentially from the object side and is structured to satisfy the condition given below:

$$0.25 < \frac{fm - fp}{d1 \cdot n1 + d2 \cdot n2} < 0.38$$

where
fm: focal length of the photographing lens
fp: synthesized focal length of the photographing lens and auxiliary lens in a panoramic state
d1: thickness of the positive lens along the axis
n1: refractive index with respect to d-line of the positive lens ($\lambda = 587.6$ nm)
d2: thickness of the negative lens on the axis
n2: refractive index with respect to d-line of the negative lens ($\lambda = 587.6$ nm).

5. An optical apparatus according to claim 4, wherein said auxiliary lens is structured to satisfy the condition given below where the refractive index with respect to d-line of the positive lens ($\lambda = 587.6$ nm) is n1 and the refractive index with respect do d-line of the negative lens ($\lambda = 587.6$ nm) is n2:

$$0.08 < n1 - n2 < 0.23.$$

6. An optical apparatus according to claim 5, wherein said auxiliary lens is structured to satisfy the condition given below where the radius of curvature of the surface of said positive lens facing the object side is r1 and the radius of curvature of the surface of said negative lens facing the image formation side is r3:

$$1.9 < r1/r3 < 2.5.$$

7. An optical apparatus according to claim 6, wherein said auxiliary lens is structured to satisfy the condition given below where the Abbe number of said positive lens $v1$ and the Abbe number of said negative lens is $v2$:

$$4 < v1 - v2 < 9.$$

8. An optical apparatus according to claim 3, wherein said auxiliary lens is a single lens having positive refractive power and is structured to satisfy the condition given below where the focal length of said photographing lens is fm and the synthesized focal length of said auxiliary lens and said photographing lens is fp:

$$0.91 < fp/fm < 0.95.$$

9. An optical apparatus according to claim 8, wherein said auxiliary lens is further structured to satisfy the condition given below:

$$0.3 < \frac{fm - fp}{d \cdot n} < 0.4$$

where
- fm: focal length of the photographing lens
- fp: synthesized focal length of the photographing lens and auxiliary lens in a panoramic state
- d: thickness of the positive single lens along the axis
- n: refractive index with respect to d-line of the positive single lens (λ=587.6 nm).

10. An optical apparatus according to claim 9, wherein
said auxiliary lens is further structured to satisfy the condition given below:

$$-2 < \frac{r2 + r1}{r2 - r1} < 7$$

where
- r1: radius of curvature of the surface of the positive single lens facing the object side
- r2: radius of curvature of the surface of the negative single lens facing the image formation side.

11. An optical apparatus according to claim 10, wherein
said auxiliary lens is further structured to satisfy the condition given below:

$$50 < n \cdot (\nu - 20)$$

where
- n: refractive index with respect to d-line (λ=587.6 nm) of the positive single lens
- ν: Abbe number of the positive single lens.

12. An optical apparatus according to claim 3, wherein an auxiliary lens supporting means for supporting said auxiliary lens in such a manner that the auxiliary lens is installed in or removed from the optical path between said photographing lens and a film aperture is structured to displace said auxiliary lens from a retracting position outside said photographing optical axis to a predetermined position on said photographing optical axis.

13. An optical apparatus according to claim 12, wherein
said apparatus further includes:
a pair of upper and lower shading members which can be installed or removed in order to narrow the longitudinal direction of said film aperture; and
an interlocking means for installing said shading members in or removing them from the photographing path by interlocking with the operation of the installation or removal of said auxiliary lens.

14. An optical apparatus according to claim 12, wherein
said apparatus further includes a recording means for recording a mark on a film whereby to discriminate whether the film is for a panoramic photographing or not by interlocking with the operation of the installation or removal of said auxiliary lens.

15. An optical apparatus according to claim 1, wherein the optical apparatus is structured in accordance with the data stated in the following Tables 1 and 4:

TABLE 1

(Master lens OL1)

fm = 28.60
BF = 27.04
FN = 3.5
2ω = 73.9°

| | R | d | ν | n |
|---|---|---|---|---|
| 1 | 25.553 | 1.60 | 54.6 | 1.51454 |
| 2 | 12.897 | 12.10 | | |
| 3 | 13.541 | 8.00 | 47.5 | 1.78797 |
| 4 | 49.286 | 1.30 | | |
| 5 | −26.032 | 1.40 | 30.1 | 1.69895 |
| 6 | 12.046 | 0.40 | | |
| 7 | 19.311 | 2.70 | 45.4 | 1.79668 |
| 8 | −19.311 | 27.04 | | |

TABLE 4

(1st embodiment combined with OL1)

fp = 25.50
BF = 15.10
FN = 4.0
2ω = 74.4°

Auxiliary lens CL1

| | r | d | ν | n |
|---|---|---|---|---|
| 0 | | 6.25 | | |
| 1 | 103.765 | 4.70 | 45.4 | 1.79668 |
| 2 | −20.088 | 1.00 | 38.1 | 1.60342 |
| 3 | 48.844 | 15.10 | | |

Conditional corresponding value
fp/fm = 0.892

$$\frac{fm - fp}{d1 \cdot n1 + d2 \cdot n2} = 0.308$$

n1 − n2 = 0.193
r1/r3 = 2.124
ν1 − ν2 = 7.3 wherein, in the above tables, the numbers shown at the left side end represent surface number from the object side; R and r, radii of curvature; d, surface interval; n, refractive index along d-line (λ=587.6 nm); λ, Abbe number; the mark fm designates the focal length of the photographing lens; fp, the synthesized focal length at the time of a panoramic photographing with the auxiliary lens being installed; FN, F number; BF, back focus; and 2ω, an angle of view in Leica size.

16. An optical apparatus according to claim 1, wherein the optical apparatus is structured in accordance with the data stated in the following Tables 2 and 5:

TABLE 2

(Master lens OL2)

fm = 28.35
BF = 22.90
FN = 4.0
2ω = 74.2°

| | R | d | ν | n |
|---|---|---|---|---|
| 1 | 9.408 | 0.90 | 40.7 | 1.58144 |
| 2 | 7.214 | 2.60 | 54.7 | 1.72916 |
| 3 | 13.406 | 1.20 | | |
| 4 | −21.962 | 0.90 | 31.1 | 1.68893 |
| 5 | 9.368 | 0.30 | | |
| 6 | 13.614 | 2.70 | 39.6 | 1.80454 |
| 7 | −18.452 | 22.90 | | |

TABLE 5

(2nd embodiment combined with OL2)

fp = 25.60

TABLE 5-continued (2nd embodiment combined with OL2)

BF = 13.50
FN = 4.5
2ω = 73.6°

Auxiliary lens CL2

|   | r       | d     | ν    | n       |
|---|---------|-------|------|---------|
| 0 |         | 4.90  |      |         |
| 1 | 96.484  | 3.50  | 45.4 | 1.79668 |
| 2 | −18.427 | 1.00  | 40.3 | 1.60717 |
| 3 | 44.574  | 13.50 |      |         |

Conditional corresponding value
fp/fm = 0.903

$$\frac{fm - fp}{d1 \cdot n1 + d2 \cdot n2} = 0.348$$

n1 − n2 = 0.190
r1/r3 = 2.165
ν1 − ν2 = 5.1 wherein, in the above tables, the numbers shown at the left side end represent surface number from the object side; R and r, radii of curvature; d, surface interval; n, refractive index along d-line (λ=587.6 nm); ν, Abbe number; the mark fm designates the focal length of the photographing lens; fp, the synthesized focal length at the time of a panoramic photographing with the auxiliary lens being installed; FN, F number; BF, back focus; and 2ω, an angle of view in Leica size.

17. An optical apparatus according to claim 1, wherein the optical apparatus is structured in accordance with the data stated in the following Tables 2 and 6:

TABLE 2

(Master lens OL2)

fm = 28.35
BF = 22.90
FN = 4.0
2ω = 74.2°

|   | R       | d     | ν    | n       |
|---|---------|-------|------|---------|
| 1 | 9.408   | 0.90  | 40.7 | 1.58144 |
| 2 | 7.214   | 2.60  | 54.7 | 1.72916 |
| 3 | 13.406  | 1.20  |      |         |
| 4 | −21.962 | 0.90  | 31.1 | 1.68893 |
| 5 | 9.368   | 0.30  |      |         |
| 6 | 13.614  | 2.70  | 39.6 | 1.80454 |
| 7 | −18.452 | 22.90 |      |         |

TABLE 6

(3rd embodiment combined with OL2)

fp = 26.49
BF = 16.60
FN = 4.7
2ω = 71.5°

Auxiliary lens CL3

|   | r       | d     | ν    | n       |
|---|---------|-------|------|---------|
| 0 |         | 2.80  |      |         |
| 1 | 141.778 | 2.50  | 47.5 | 1.78797 |
| 2 | −24.392 | 1.00  | 40.3 | 1.60717 |
| 3 | 60.209  | 16.60 |      |         |

Conditional corresponding value
fp/fm = 0.934

$$\frac{fm - fp}{d1 \cdot n1 + d2 \cdot n2} = 0.306$$

n1 − n2 = 0.181
r1/r3 = 2.355

TABLE 6-continued (3rd embodiment combined with OL2)

ν1 − ν2 = 7.2 wherein, in the above tables, the numbers shown at the left side end represent surface number from the object side; R and r, radii of curvature; d, surface interval; n, refractive index along d-line (λ=587.6 nm); ν, Abbe number; the mark fm designates the focal length of the photographing lens; fp, the synthesized focal length at the time of a panoramic photographing with the auxiliary lens being installed; FN, F number; BF, back focus; and 2ω, an angle of view in Leica size.

18. An optical apparatus according to claim 1, wherein the optical apparatus is structured in accordance with the data stated in the following Tables 2 and 7:

TABLE 2

(Master lens OL2)

fm = 28.35
BF = 22.90
FN = 4.0
2ω = 74.2°

|   | R       | d     | ν    | n       |
|---|---------|-------|------|---------|
| 1 | 9.408   | 0.90  | 40.7 | 1.58144 |
| 2 | 7.214   | 2.60  | 54.7 | 1.72916 |
| 3 | 13.406  | 1.20  |      |         |
| 4 | −21.962 | 0.90  | 31.1 | 1.68893 |
| 5 | 9.368   | 0.30  |      |         |
| 6 | 13.614  | 2.70  | 39.6 | 1.80454 |
| 7 | −18.452 | 22.90 |      |         |

TABLE 7

(4th embodiment combined with OL2)

fp = 26.49
BF = 16.60
FN = 4.7
2ω = 73.3°

Auxiliary lens CL4

|   | r        | d     | ν    | n       |
|---|----------|-------|------|---------|
| 0 |          | 2.60  |      |         |
| 1 | 281.000  | 3.70  | 64.1 | 1.51680 |
| 2 | −281.000 | 16.60 |      |         |

Conditional corresponding value
fp/fm = 0.934

$$\frac{fm - fp}{d \cdot n} = 0.330$$

$$\frac{r2 + r1}{r2 - r1} = 0$$

n · (ν − 20) = 66.89 wherein, in the above tables, the numbers shown at the left side end represent surface number from the object side; R and r, radii of curvature; d, surface interval; n, refractive index along d-line (λ=587.6 nm); ν, Abbe number; the mark fm designates the focal length of the photographing lens; fp, the synthesized focal length at the time of a panoramic photographing with the auxiliary lens being installed; FN, F number; BF, back focus; and 2ω, an angle of view in Leica size.

19. An optical apparatus according to claim 1, wherein the optical apparatus is structured in accordance with the data stated in the following Tables 2 and 8:

TABLE 2

(Master lens OL2)

fm = 28.35
BF = 22.90
FN = 4.0
2ω = 74.2°

| | R | d | ν | n |
|---|---|---|---|---|
| 1 | 9.408 | 0.90 | 40.7 | 1.58144 |
| 2 | 7.214 | 2.60 | 54.7 | 1.72916 |
| 3 | 13.406 | 1.20 | | |
| 4 | −21.962 | 0.90 | 31.1 | 1.68893 |
| 5 | 9.368 | 0.30 | | |
| 6 | 13.614 | 2.70 | 39.6 | 1.80454 |
| 7 | −18.452 | 22.90 | | |

TABLE 8

(5th embodiment combined with OL2)

fp = 26.50
BF = 17.35
FN = 4.7
2ω = 73.1°

Auxiliary lens CL5

| | r | d | ν | n |
|---|---|---|---|---|
| 0 | | 2.60 | | |
| 1 | ∞ | 2.95 | 55.6 | 1.69680 |
| 2 | −186.024 | 17.35 | | |

Conditional corresponding value
fp/fm = 0.935

$$\frac{fm - fp}{d \cdot n} = 0.370$$

$$\frac{r2 + r1}{r2 - r1} = -1$$

$$n \cdot (\nu - 20) = 60.41$$

wherein, in the above tables, the numbers shown at the left side end represent surface number from the object side; R and r, radii of curvature; d, surface interval; n, refractive index along d-line (λ=587.6 nm); ν, Abbe number; the mark fm designates the focal length of the photographing lens; fp, the synthesized focal length at the time of a panoramic photographing with the auxiliary lens being installed; FN, F number; BF, back focus; and 2ω, an angle of view in Leica size.

20. An optical apparatus according to claim 1, wherein the optical apparatus is structured in accordance with the data stated in the following Tables 3 and 9:

TABLE 3

(Master lens OL3)

fm = 34.48
BF = 29.70
FN = 3.5
2ω = 64.4°

| | R | d | ν | n |
|---|---|---|---|---|
| 1 | 10.080 | 3.30 | 55.5 | 1.69680 |
| 2 | 14.734 | 1.17 | | |
| 3 | −20.732 | 1.00 | 34.6 | 1.63980 |
| 4 | 11.755 | 0.47 | | |
| 5 | 19.201 | 2.60 | 46.5 | 1.80420 |
| 6 | −19.201 | 29.70 | | |

TABLE 9

(6th embodiment combined with OL3)

fp = 30.48
BF = 18.00
FN = 4.5

TABLE 9-continued (6th embodiment combined with OL3)

2ω = 65.7°

Auxiliary lens CL6

| | r | d | ν | n |
|---|---|---|---|---|
| 0 | | 5.20 | | |
| 1 | 159.715 | 5.50 | 43.3 | 1.84042 |
| 2 | −12.742 | 1.00 | 38.0 | 1.72342 |
| 3 | 76.742 | 18.00 | | |

Conditional corresponding value
fp/fm = 0.884

$$\frac{fm - fp}{d1 \cdot n1 + d2 \cdot n2} = 0.337$$

n1 − n2 = 0.117
r1/r3 = 2.081
ν1 − ν2 = 5.3 wherein, in the above tables, the numbers shown at the left side end represent surface number from the object side; R and r, radii of curvature; d, surface interval; n, refractive index along d-line (λ=587.6 nm); ν, Abbe number; the mark fm designates the focal length of the photographing lens; fp, the synthesized focal length at the time of a panoramic photographing with the auxiliary lens being installed; FN, F number; BF, back focus; and 2ω, an angle of view in Leica size.

21. An optical apparatus according to claim 1, wherein the optical apparatus is structured in accordance with the data stated in the following Tables 3 and 10:

TABLE 3

(Master lens OL3)

fm = 34.48
BF = 29.70
FN = 3.5
2ω = 64.4°

| | R | d | ν | n |
|---|---|---|---|---|
| 1 | 10.080 | 3.30 | 55.5 | 1.69680 |
| 2 | 14.734 | 1.17 | | |
| 3 | −20.732 | 1.00 | 34.6 | 1.63980 |
| 4 | 11.755 | 0.47 | | |
| 5 | 19.201 | 2.60 | 46.5 | 1.80420 |
| 6 | −19.201 | 29.70 | | |

TABLE 10

(7th embodiment combined with OL3)

fp = 31.80
BF = 21.50
FN = 4.6
2ω = 64.0°

Auxiliary lens CL7

| | r | d | ν | n |
|---|---|---|---|---|
| 0 | | 2.70 | | |
| 1 | ∞ | 5.50 | 57.6 | 1.49108 |
| 2* | −135.935 | 21.50 | | | k = +148.0

Conditional corresponding value
fp/fm = 0.922

$$\frac{fm - fp}{d \cdot n} = 0.326$$

$$\frac{r2 + r1}{r2 - r1} = -1$$

$$n \cdot (\nu - 20) = 56.06$$

wherein, in the above tables, the numbers shown at the left side end represent surface number from the object side; R and r, radii of curvature; d, surface interval; n, refractive index along d-line (λ=587.6 nm); ν, Abbe number; the mark fm designates the focal length of the photographing lens; fp, the synthesized focal length at the time of a panoramic photographing with the auxiliary lens being installed; FN, F number; BF, back focus; and 2ω, an angle of view in Leica size, and in conditional corresponding value of Table 10, d represents axial thickness of a positive single lens; n, refractive index of the positive single lens with respect to d-line; and ν, Abbe number of the positive lens.

22. An optical apparatus according to claim 1, wherein the optical apparatus is structured in accordance with the data stated in the following Tables 3 and 11:

TABLE 3

(Master lens OL3)

fm = 34.48
BF = 29.70
FN = 3.5
2ω = 64.4°

| | R | d | ν | n |
|---|---|---|---|---|
| 1 | 10.080 | 3.30 | 55.5 | 1.69680 |
| 2 | 14.734 | 1.17 | | |
| 3 | −20.732 | 1.00 | 34.6 | 1.63980 |
| 4 | 11.755 | 0.47 | | |
| 5 | 19.201 | 2.60 | 46.5 | 1.80420 |
| 6 | −19.201 | 29.70 | | |

TABLE 11

(8th embodiment combined with OL3)

fp = 31.80
BF = 16.20
FN = 4.6
2ω = 63.7°

Auxiliary lens CL8

| | r | d | ν | n |
|---|---|---|---|---|
| 0 | | 8.80 | | |
| 1 | 69.140 | 4.70 | 54.0 | 1.71300 |
| 2 | 95.370 | 16.20 | | |

Conditional corresponding value
fp/fm = 0.922

$$\frac{fm - fp}{d \cdot n} = 0.332$$

$$\frac{r2 + r1}{r2 - r1} = 6.271$$

$$n \cdot (\nu - 20) = 58.24$$

wherein, in the above tables, the numbers shown at the left side end represent surface number from the object side; R and r, radii of curvature; d, surface interval; n, refractive index along d-line (λ=587.6 nm); ν, Abbe number; the mark fm designates the focal length of the photographing lens; fp, the synthesized focal length at the time of a panoramic photographing with the auxiliary lens being installed; FN, F number; BF, back focus; and 2ω, an angle of view in Leica size; and in conditional corresponding value of Table 11, d represents axial thickness of a positive single lens; n, refractive index of the positive single lens with respect to d-line; and ν, Abbe number of the positive lens.

23. A panoramic photographing attachment to a camera having a photographing lens and a film aperture, including the following:
   shading members for narrowing the longitudinal direction of said film aperture;
   an auxiliary lens having positive refractive power for converting its focal length synthesized with said photographing lens to be a focal length shorter than the individual focal length of the photographing lens without shifting the image formation position; and
   an auxiliary lens supporting means holding said auxiliary lens at one end and having said shading members at the other end so that said shading members can be held near said film aperture while said auxiliary lens is being held at a predetermined position on the optical path between said photographing lens and said film aperture.

24. A panoramic photographing attachment according to claim 23, wherein
   said auxiliary lens supporting means includes a lens holding cylinder formed in a stand shape having an opening to the film aperture side, and at one end of said lens holding cylinder said auxiliary lens is held, and further, the outer periphery of said one end is formed smaller than said film aperture, and furthermore, at the other end of said lens holding cylinder said shading members are provided while the other end thereof is formed in an oblong shape to fittingly support itself in the inner face of said film aperture, and is structured to be positioned at a predetermined position on said photographing optical axis after passing through said film aperture.

25. A panoramic photographing attachment according to claim 23, wherein
   said shading member has a mark to be recorded on a film in order to discriminate whether the photographing is panoramic or not in response to the operation of the installation or removal of said auxiliary lens.

26. An optical apparatus capable of performing a panoramic photographing, including the following:
   a photographing lens for forming an image on an image plane;
   an auxiliary lens having positive refractive power for converting its focal length synthesized with said photographing lens to be a focal length shorter than the individual focal length of the photographing lens; and
   an auxiliary lens supporting means for supporting said auxiliary lens between said photographing lens and said image plane.

* * * * *